（12） United States Patent
Kliot (10) Patent No.: US 6,322,212 B1
(45) Date of Patent: *Nov. 27, 2001

(54) EYEGLASS RETAINER WITH FASHION ACCESSORY HAVING CLOSURE MEANS TO HOLD MATERIAL OF THE ACCESSORY SECURELY AGAINST EYEGLASS TEMPLE PIECE

(75) Inventor: Eugene Kliot, New York, NY (US)

(73) Assignee: Visual Impact Films Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/569,703

(22) Filed: May 12, 2000

Related U.S. Application Data

(63) Continuation-in-part of application No. 09/244,585, filed on Feb. 4, 1999, now Pat. No. 6,062,690.

(51) Int. Cl.⁷ ....................................................... G02C 3/00
(52) U.S. Cl. ............................................. 351/157; 351/156
(58) Field of Search .................................... 351/157, 156, 351/158, 41; 24/3.3

(56) References Cited

U.S. PATENT DOCUMENTS 6,062,690 * 5/2000 Kliot ..................................... 351/157

* cited by examiner

Primary Examiner—Hung Xuan Dang
(74) Attorney, Agent, or Firm—Hughes Hubbard & Reed LLP; Ronald Abramson; Sheryl L. Sandridge (57) ABSTRACT

An improved eyeglass retainer is disclosed, having an annular closure attaching to the eyeglass frames. The annular closure draws the material of the retainer over the attachment means of the retainer, and bunches and constricts it in front of the attachment means, so as to hide said attachment means from view, and to maintain a close fit of the retainer material with the eyeglass frames, even in the presence of winds and inertial forces. In an alternate embodiment, the annular closure in combination with retaining enclosures located on the eyeglass temple pieces secures the retainer to the temple pieces.

9 Claims, 7 Drawing Sheets

EYEGLASS RETAINER WITH FASHION ACCESSORY HAVING CLOSURE MEANS TO HOLD MATERIAL OF THE ACCESSORY SECURELY AGAINST EYEGLASS TEMPLE PIECE

This application is a continuation-in-part of application Ser. No. 09/244,585 now U.S. Pat. No. 6,062,690 filed Feb. 4, 1999 now U.S. Pat. No. 6,062,690.

BACKGROUND OF THE INVENTION

1. Field of the Invention

This invention generally relates to the field of eyeglass retainer devices which attach or are attached to eyeglass frames, and more specifically to an improved eyeglass retainer having superior performance characteristics during vigorous outdoor activity and which maintains an attractive appearance during hard use.

2. Description of the Related Art

Eyeglass retainers are well-known products which are used to keep glasses from falling off, or to hold them in a hanging position in front of the neck after they have been deliberately taken off. Eyeglass retainers are often used to hold both corrective eyeglasses as well as sunglasses and safety glasses in place during vigorous athletic or outdoor activity such as skiing, in-line skating, jogging, horseback riding, tennis, team sports, etc. Since the retainers are worn on the head, fashion is also an important objective in this field.

Figure 1:
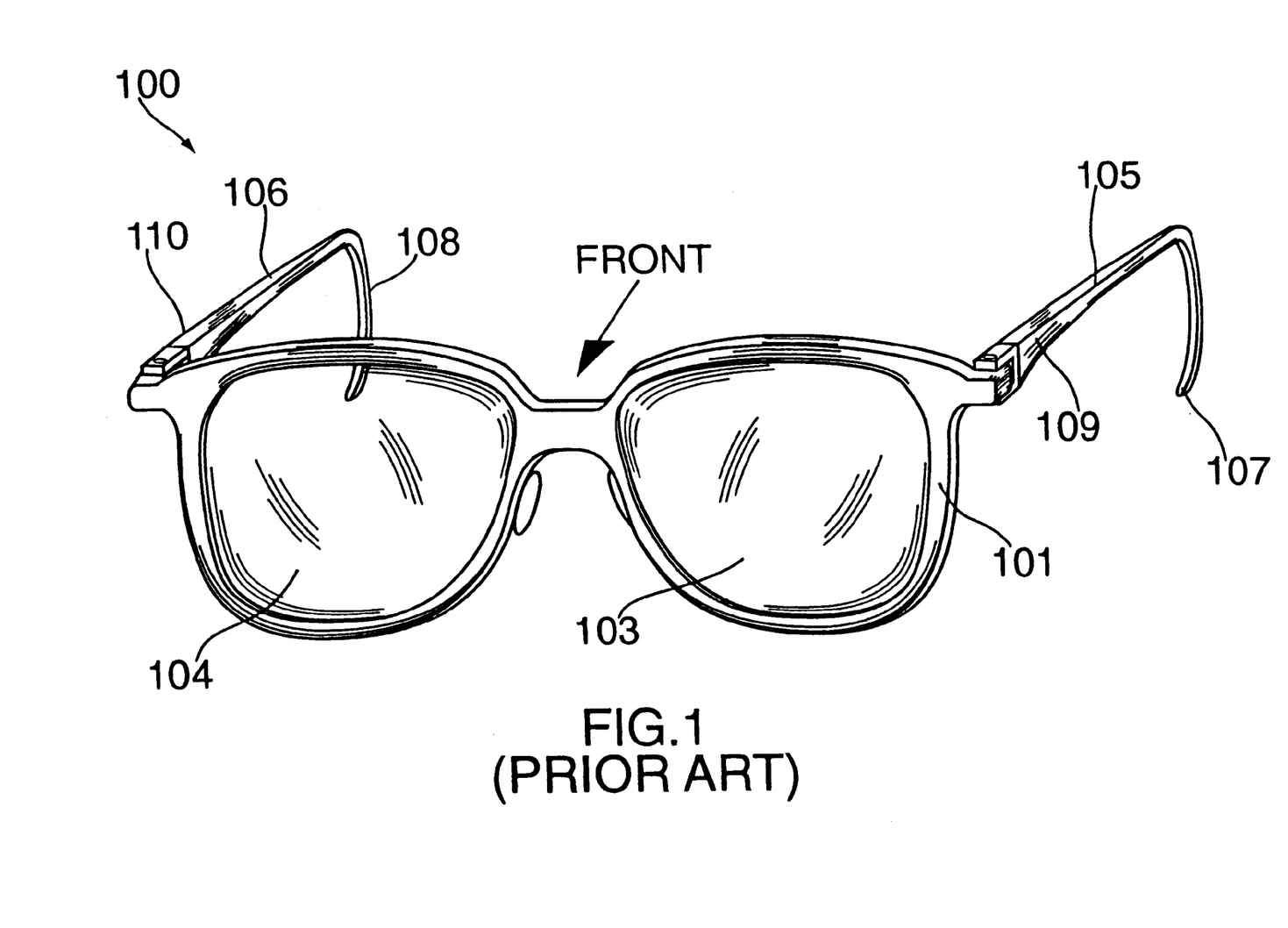
FIG. 1 shows for reference the various parts of an ordinary prior art pair of eyeglasses.

For purposes of the following discussion we will first define, with reference to FIG. 1, terms for the various parts of the components involved:

"Lens holder" means the front portion 101 of the eyeglass frame 100, which holds the lenses 103,104.

"Temple pieces" means the left and right pieces 105, 106 (which need not necessarily be curved), which attach to the sides of the lens holder and extend back over the wearer's ears;

"Earpiece" means that portion 107, 108 of the temple piece that engages the wearer's ear.

"Front" is defined for purposes hereof with relation to the wearer's head when the glasses and retainers are worn.

Several forms of eyeglass retainers are known in the art.

One variety consists of tubular retainers that slip over the earpieces (107, 108) and hold them by friction. Williams, U.S. Pat. No. 4,696,556; Perry, U.S. Pat. No. 5,181,052; Kalbach, U.S. Pat. No. 5,575,042; McClellan, U.S. Pat. No. 5,181,052. Also Bagley, U.S. Pat. No. 5,092,667. The drawback to all of these implementations is slippage, and in some cases cumbersomeness in getting the retainers on and off during use.

Partially tubular retainers are known, which have front tubular portions that slip over the earpieces but attach by friction in the front area of the temple pieces (109, 110). The tubular portions end to the rear of the point of attachment, opening up, so as to permit the retainers not to follow the earpieces, but rather to extend straight back and be secured around the wearer's head. Linden, DE G 8521724.7. These implementations are again disadvantaged by slippage. In addition, many of the attachment means used in these inventions are unsightly, which can be a strongly negative consideration.

Other non-tubular retainers have been designed that attach in the front area of the temple pieces (109, 110) and then extend straight back so as to be securable around the wearer's head. Wilson, U.S. Pat. No. 5,367,347. Again, slippage is a serious concern with this type of implementation.

Also known are retainers that make a positive attachment to the front areas of the temple pieces, such as by clip (Kliot, U.S. Pat. No. 5,528,800; Tabacchi, U.S. Pat. No. 4,743,105), or hook and loop (Velcro®) fasteners (Girard, FR 2,704, 658), and then extend back so as to be securable around the wearer's head. While these make for a more positive attachment, in most cases the attachment means are exposed and tend to be unsightly.

Cord-like retainers also exist, which are secured to the temple pieces with eyelets, loops or through holes. Barrett, U.S. Pat. No. 5,005,263. These are primarily intended for light duty, indoor use.

Also known are systems akin to goggles which have no temple pieces and in which the retainers attach directly to the lens holder. Tilton, U.S. Pat. No. D 178,328; Bianchi, FR 2,626,188; Daigle, PCT WO 88/0149. While these can be highly functional, they are not adaptable so as to look like ordinary glasses or sunglasses, which is desirable in this type of device.

Figure 2A:
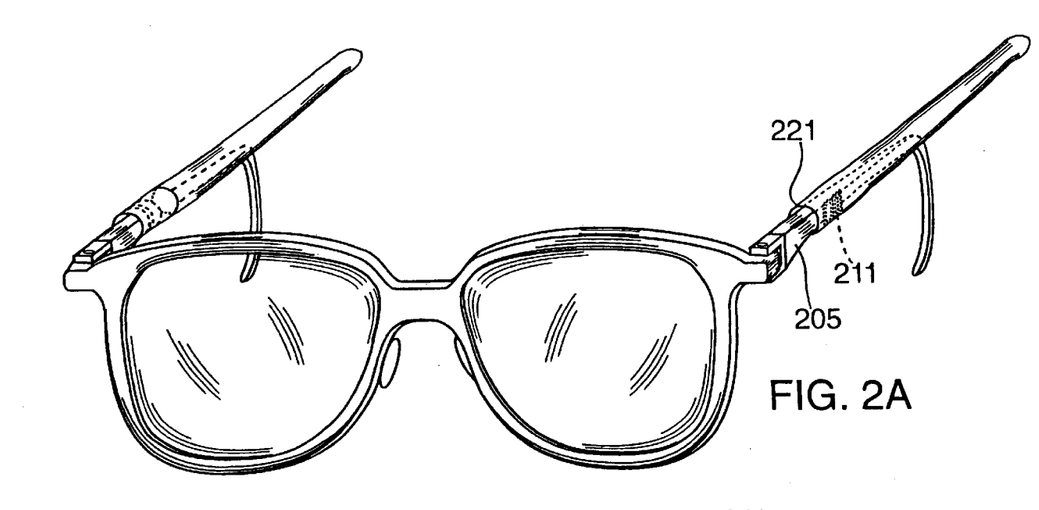
FIG. 2A is a perspective view of the prior art retainer device of Kliot, U.S. Pat. No. 5,528,000.
Figures 2B, 2C:
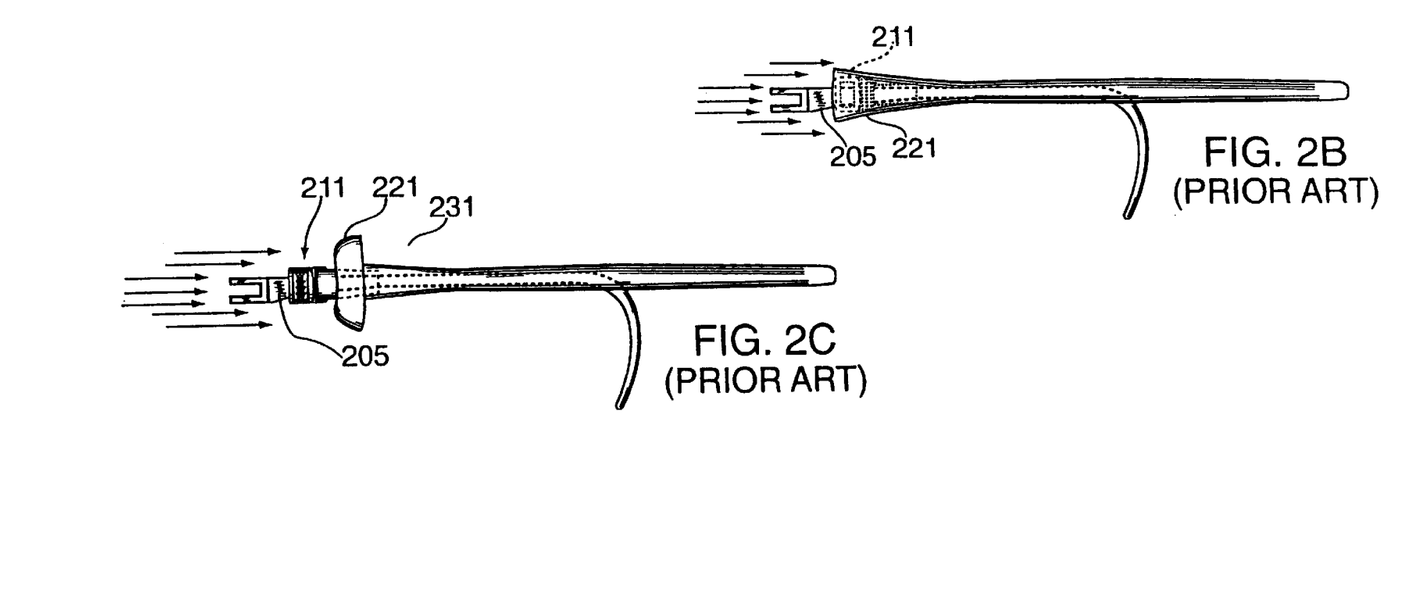
FIG. 2B is a close up partially sectional side view of such device showing a "windsock" effect in a strong headwind.
FIG. 2C is a close up partially sectional side view of such device showing a "blow-back" effect on the retainer in a strong headwind.

My prior patents in this field goes further than the other examples. As shown in FIG. 2A, Kliot, U.S. Pat. No. 5,528,800, combines a positive attachment, clip 211, toward the front the temple piece 205 with a partially tubular structure 221 which fits over and to some extent covers the attachment means 211. However, while this prior patent addresses most of the shortcomings of the other prior art, even it has one significant problem, which is that in a wind, or where the eyeglasses are exposed to inertial forces (e.g., Tennis), the retainer material in tubular portion 221 distorts undesirably, assuming an unsightly "windsock" appearance (231 in FIG. 2B) or pulling such material backward or flipping it over (241 in FIG. 2C) or otherwise distorting it, thereby exposing the attachment means 211 to view.

Kliot, U.S. Pat. No. 6,062,690, addresses this shortcoming, but does so with a particular design incorporating a circumferentially attached elastic band (e.g., 351 in FIG. 4). The objects of the invention can be achieved, however, with an elastic band that is only partially attached to the front portion of retainer 321, meaning that the retainer need not be tubular at the attachment point with elastic band 351.

Figure 10:
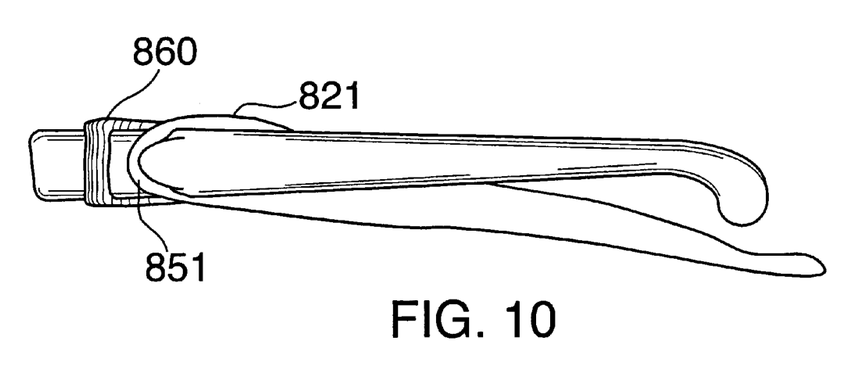
FIG. 10 is a sectional side view of an alternate embodiment of the retainer device showing temple pieces containing lips and the retainer containing an elastic sleeve located in front of the elastic band.

In another embodiment, the attachment is achieved by incorporating a lip or a groove into the temple pieces to retain the elastic band 851 (in FIGS. 8–10). This embodiment is a positive attachment system where the elastic band 851 functions as the attachment mechanism when pressed against the lip or inserted into the groove of the temple pieces.

BRIEF SUMMARY OF THE INVENTION

Accordingly, it is an object of the present invention to provide an improved eyeglass retainer that combines the following advantages:

It makes a positive, non-slipping connection to the eyeglass frames;

It may be constructed using frames that are very similar to or identical with those of conventional design;

The improvement may be utilized in connection with a variety of attachment means and configurations;

All attachment mechanisms are hidden from view; and

The retainer structure in the area of the point of attachment does not distort due to wind or inertial forces;

The improved retainer design body enables easier installation and removal, maintaining an attractive appearance during use.

The foregoing and other objects of the invention are accomplished by an improved eyeglass retainer having annular closure means on the respective left and right front portions that each draws the material of the retainer over the attachment means of the retainer, and bunches or constricts it in front of the attachment means, so as to hide said attachment means from view. Further, by drawing over and constricting in front of the attachment means, the closure means maintains a close fit of the retainer material with the eyeglass frames, even in the presence of winds and inertial forces. The retainer material is attached to the elastic band so as to conceal the closure means. In another embodiment, the elastic band also serves as an attachment mechanism, and the temple pieces may include lips or grooves in which the elastic band would sit to maintain a non-slipping connection. An alternate embodiment involving a wider elastic annular closure means is also described, which conforms to the narrower profile in front of the attachment means, rather than bunching material in front of it.

The manner in which the invention achieves these objects is more particularly shown by the drawings enumerated below, and by the detailed description that follows.

BRIEF DESCRIPTION OF THE DRAWINGS

The following briefly describes the accompanying drawings.

DETAILED DESCRIPTION OF THE PREFERRED EMBODIMENT

The embodiments of the invention are illustrated in FIGS. 3–5, FIGS. 6–7 and FIGS. 8–10, and described in the text that follows. Although the invention has been most specifically illustrated with particular embodiments, it should be understood that the invention concerns the principles by which such embodiments have been constructed and is by no means limited to the specific configurations shown.

In one embodiment, an elastic band 351 is sewn into the front, tubular body portion of retainer 321. This elasticized front portion is pulled over the retainer attachment means, shown here as a clip 311. Clip 311 as shown in the embodiment is a two-piece device, in which one piece 312 is affixed to the temple piece and the other 313 slidably clicks into place in a releasable manner, so as to make a positive (though readily releasable) attachment. (There are of course left and right counterparts to these elements, whose presence will be assumed for purposes of the present discussion.)

Figure 4:
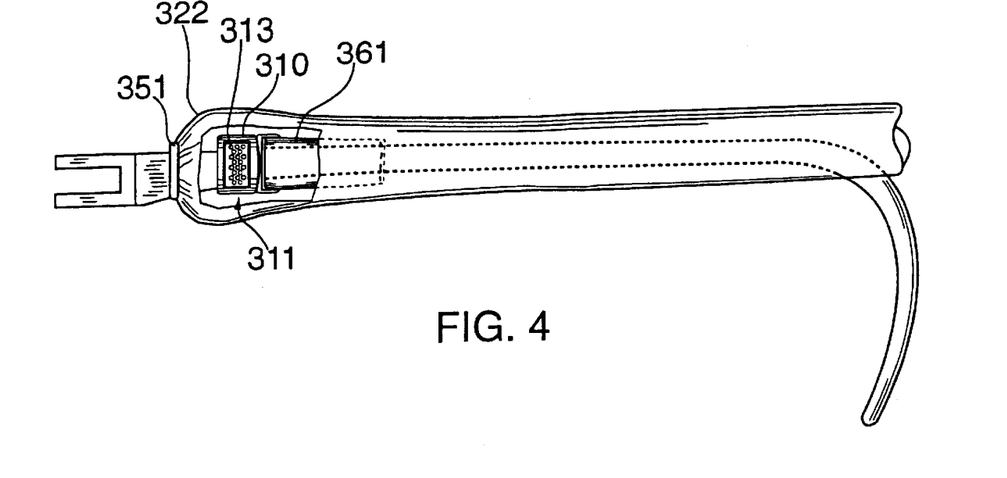
FIG. 4 is a partially sectional side view of the improved retainer device of the preferred embodiment of the present invention as installed on the temple piece of a pair of eyeglasses.

As shown in FIG. 4, when elastic band 351 has been pulled into place, it constricts, and effects a closure over the front of attachment means 311. This in turn bunches the material 322 over the front of attachment means 311. The result is to hide attachment means 311 thoroughly from view, in such a manner that will not be disturbed by wind or inertial forces. Though shown in the embodiment as a narrow, sewn-in elastic band 351, the closure means of the present invention may be any element that provides a circumferential tightening force, such as a drawstring, slipknot, resilient fabric, elastic materials of various widths, hook and loop (Velcro®) fastener or the like. The mechanics of operation can be either to bunch material together 322 (as above) to form a narrower circumference in front of the attachment means 311, thereby positively holding the retainer in place, or alternatively, for example, with the use of wider elastic 551 (FIG. 5), to cause the entire front portion of the retainer to conform to the structure of narrower circumference in front of the attachment means 311, again effecting a positive holding force.

Figure 3:
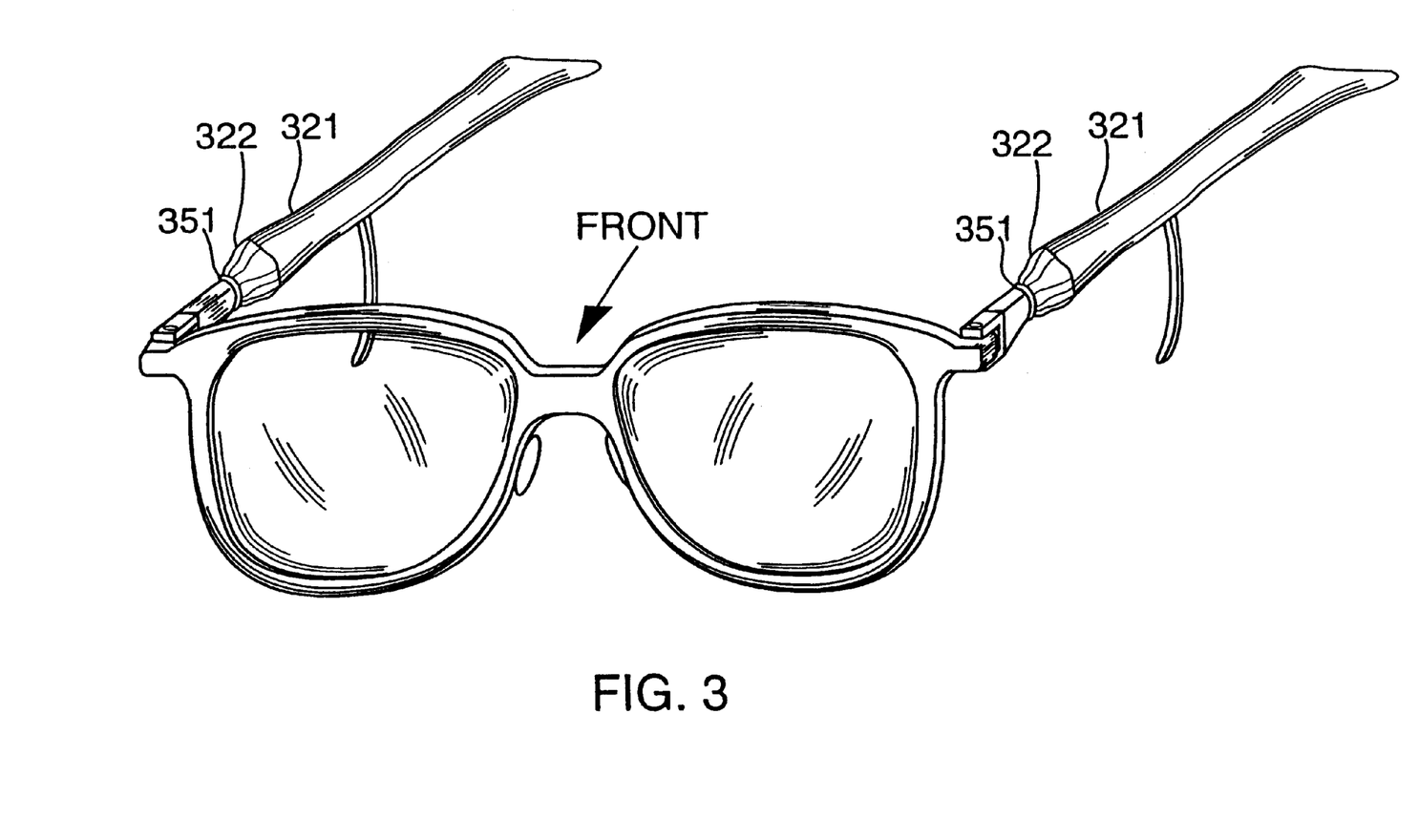
FIG. 3 is a perspective view of the improved retainer of the preferred embodiment present invention, as installed on a pair of eyeglasses.
Figure 5:
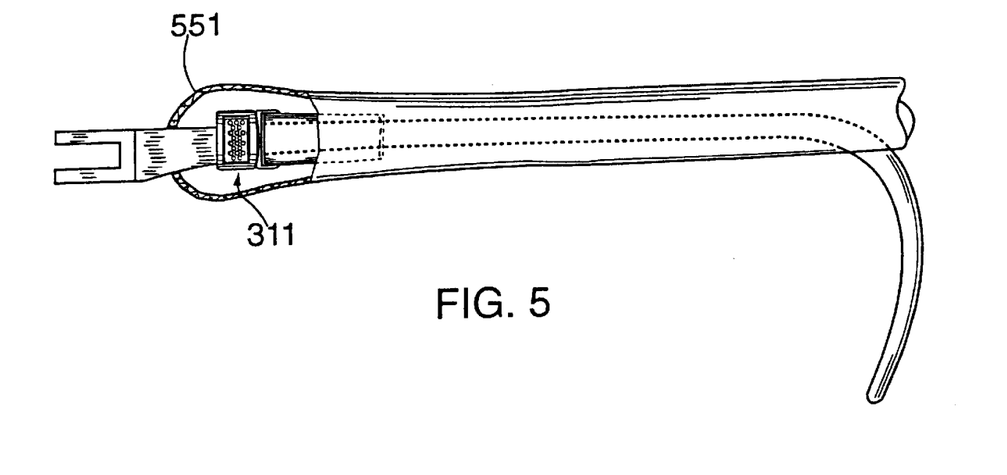
FIG. 5 is a partially sectional side view of an alternate embodiment of the improved retainer device of the present invention as installed on the temple piece of a pair of eyeglasses.
Figure 6:
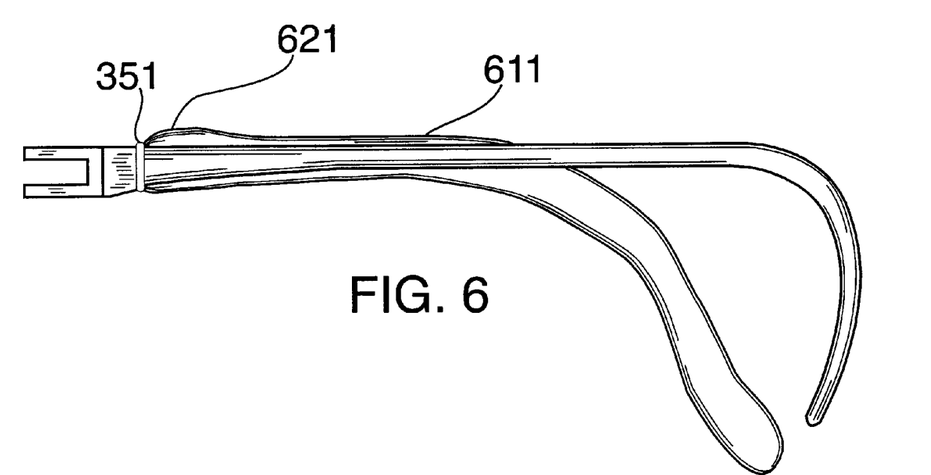
FIG. 6 is a perspective side view of the improved retainer device of an alternatively preferred embodiment of the present invention, as installed on the temple piece of a pair of eyeglasses and viewed from inside the temple piece.
Figure 7:
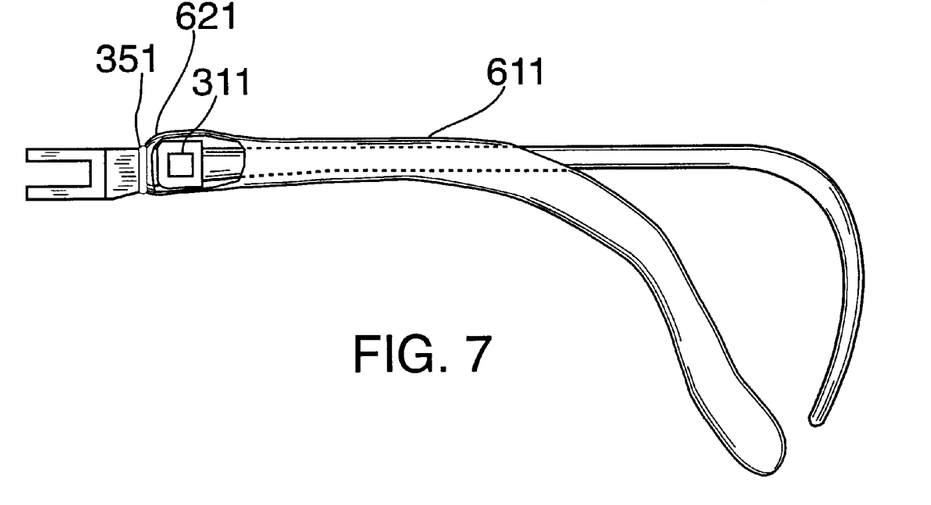
FIG. 7 is a partially sectional side view of the improved retainer device of an alternatively preferred embodiment of the present invention, as installed on the temple piece of a pair of eyeglasses and viewed from outside the temple piece.
Figure 8A:
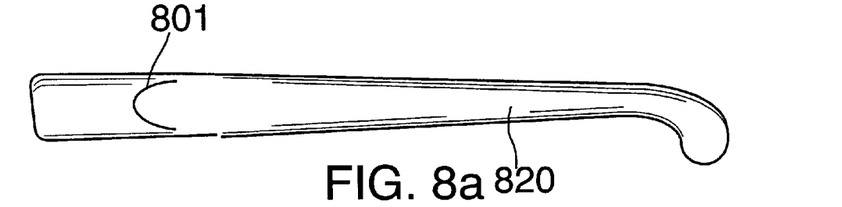
FIG. 8 is a sectional side view of an alternate embodiment of the retainer device showing temple pieces containing lips.
Figure 8B:
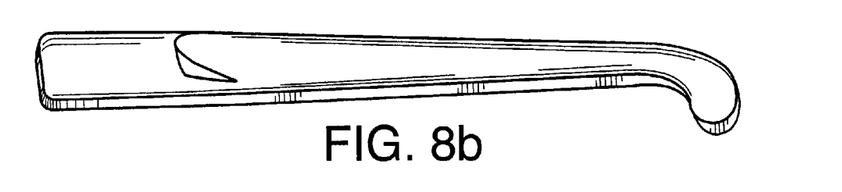
Figure 8C:
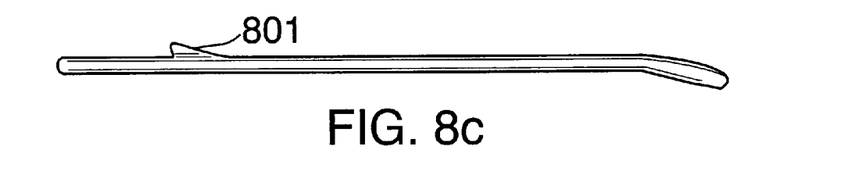
Figure 8D:
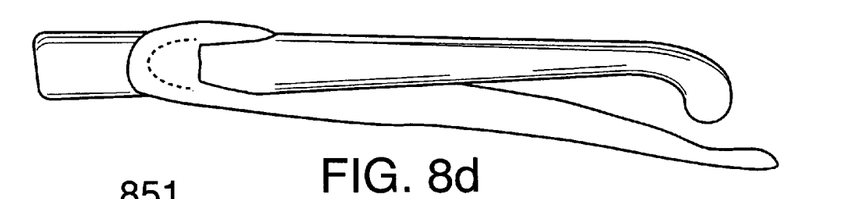
Figure 8E:
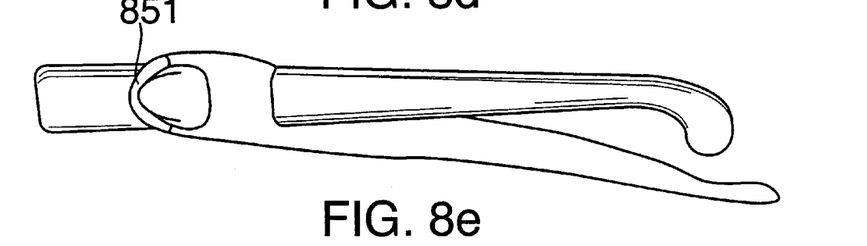
Figure 8F:
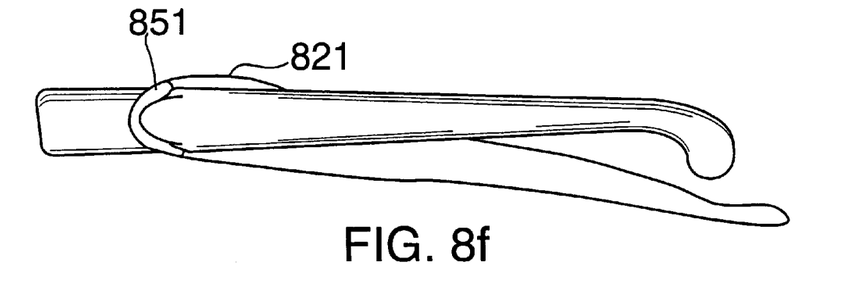
Figure 9A:
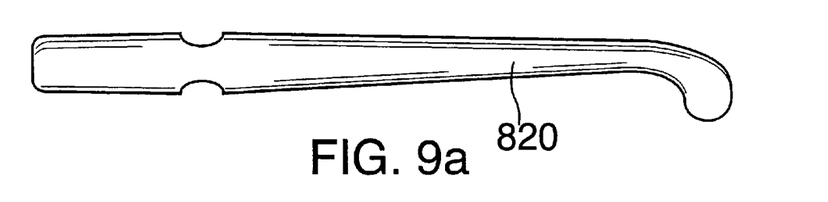
FIG. 9 is a sectional side view of an alternate embodiment of the retainer device showing temple pieces containing grooves.
Figure 9B:
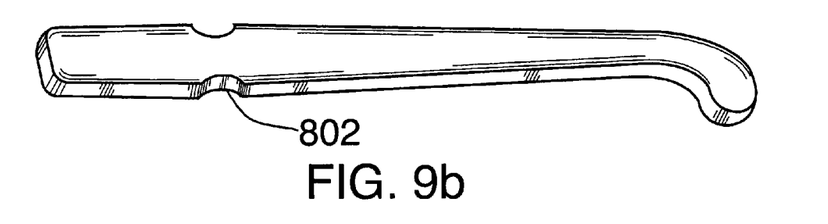
Figure 9C:
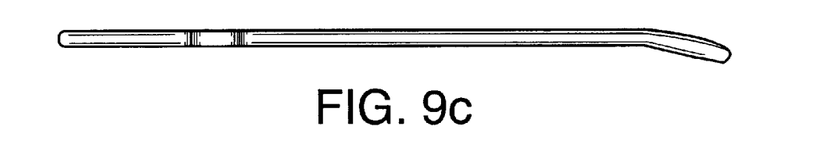
Figure 9D:
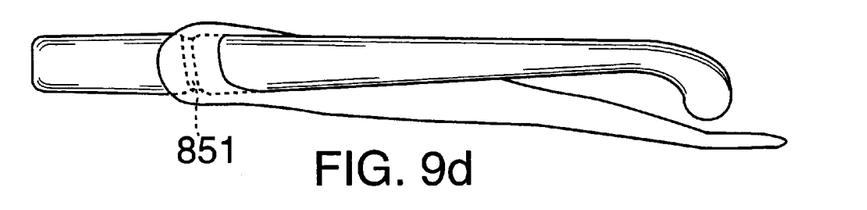
Figure 9E:
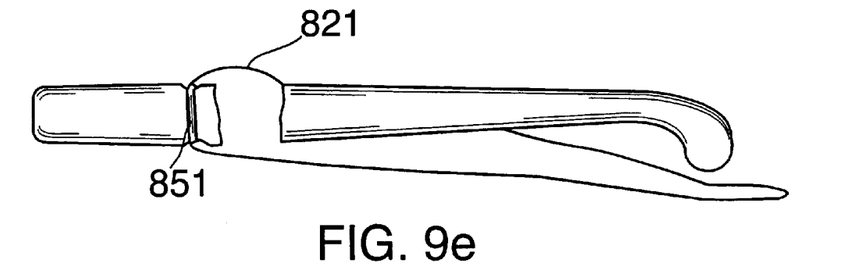
Figure 9F:
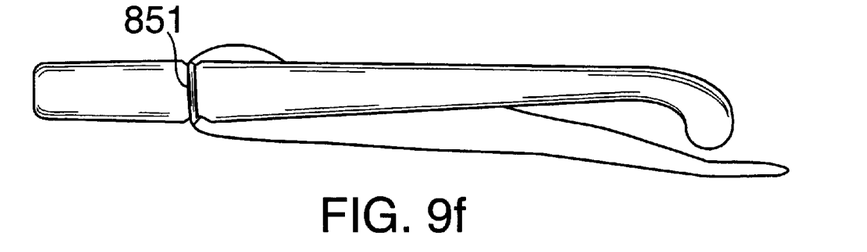

Alternatively to the tubular body 321 shown in FIGS. 3–5, the shape of the retainer body of the present invention may be of any design that would substantially hide the attachment means 311, thereby maintaining an attractive appearance during use. In this embodiment, a part of the elastic band 351 is sewn into the body material which results in a partly circumferential retainer body 611 (FIGS. 6–7). When the elastic band 351 has been pulled into place, it contracts and bunches 621 the partly circumferential retainer body 611 over the front of the attachment means 311, and hides the attachment from view. This partly circumferential retainer body 611 will also ease installing and removing the retainer because pushing the temple pieces through the tubular retainer body will no longer be necessary.

In FIGS. 8–9, another embodiment is shown with elastic band 851 acting also as an attachment mechanism in combination with a retaining enclosure such as a lip 801 on temple piece 820 (FIG. 8) or with a groove 802 on temple piece 820 (FIG. 9). Because lip 801 provides a positive stop for elastic band 851 from sliding down temple piece 820, the movement of elastic band 851 is constrained by lip 801 thereby securing the attachment to temple piece 820. Although lip 801 is shown on the inside portion of the temple piece, it, or any other retaining enclosures, may also be located on the outside of the temple piece. Similarly, groove 802 holds elastic band 851 within it, thereby securing the attachment to temple piece 820 without slippage. In FIG.

8, lip 801 is shown as being unitary to temple piece 820, lip 801 or the other retaining enclosures need not be unitary to the temple pieces and may be comprised of a hooking device that is affixed to the temple piece or even a screw or peg affixed to the temple piece. In this way, the device can be adapted to eyeglasses without having to reconfigure the eyeglass temple pieces.

In FIG. 10, retainer 821 also contains an elastic sleeve 860 located forward of elastic band 851 to prevent forward slippage. Although FIG. 10 shows a single elastic sleeve 860, more than one elastic sleeve may be used on retainer 821.

A desirable characteristic in the retainer assembly is resiliency in the attachment system, so as to promote a snug fit on the wearer's head. The present invention does not limit ways in which such resiliency (if desired) may be introduced in the system. For example, straps (361) may be employed as shown to connect attachment means 311 (comprising parts 312, 313) to retainer body 321, and such straps may be made of elastic material. On the other hand, a direct connection can be made without such straps, and resiliency imparted by the overall "stretch" provided in the retainer material. Alternately, elastic or resilient material can be used elsewhere in the system. In any case, the present invention will be applicable and operable regardless of whether or how resiliency is introduced in the system.

In FIGS. 3–7, separate attachment means are not a part of the present invention. While shown in the embodiments as a two-part clip, it can be any other positive means of attachment, with or without a receiving element attached to the temple piece, such as an interlocking structure, as in Tabacchi (U.S. Pat. No. 4,743,105), hook and loop fasteners (as in Girard FR 2,704,658), a screw, a clamp, glue, staples, one-piece plastic molding, etc. The present invention will work with each of such attachment means. All that is necessary are attachment means sufficiently compact so that the closure 351, 551, etc. can be pulled over it. Beyond that consideration, the type of attachment means employed, so long as it provides a positive, non-slipping attachment, is immaterial.

It is apparent from the foregoing that an improved eyeglass retainer has been developed that accomplishes the stated objects of the invention. While the presently existing embodiments have been described in detail, it will be apparent to those skilled in the art that the principles of the invention are readily adaptable to other configurations of such apparatus without departing from the scope and spirit of the invention, as defined in the following claims.

I claim:

1. An improved eyeglass retainer for an eyeglass-retainer combination, in which the eyeglasses have frames having left and right temple pieces, the ends of which towards the eyeglass lenses being regarded as the front, and in which the retainer is positively attached with attachment means to said temple pieces, wherein the improvement comprises an annular closure on the material of each end of said retainer which is proximate said attachment means, which allows each said end of said retainer to pull over said attachment means and then contract in front of said attachment means, thereby substantially hiding said attachment means from view and achieving a close fit of said material with said eyeglass frames, thereby holding said retainer securely in place during use, said annular closure comprising a front elastic band attached to the front of said attachment end of said retainer, so as to cause the material of said attachment end of said retainer to constrict after being pulled over said attachment means, and thereby to bunch up said material in front of said attachment means, and thereby achieve the said secure holding of the retainer in place.

2. The improved eyeglass retainer of claim 1, wherein said front band is a narrow band of elastic, a part of which is sewn into the front of said attachment end of said retainer.

3. The improved eyeglass retainer of claim 1, wherein said front elastic band is a wide elastic band adapted so as to conform to the narrower contour in front of said attachment means, and thereby achieve the said secure holding of the retainer in place.

4. An improved eyeglass retainer for an eyeglass-retainer combination, in which the eyeglasses have frames having left and right temple pieces, said temple pieces having retaining enclosures contained thereon, the ends of said temple pieces located towards the eyeglass lenses being regarded as the front, and in which the retainer is positively attached to each of said temple pieces by an annular closure on the material of each end of said retainer, said annular closure engaging with said retaining enclosures, thereby holding said retainer securely in place during use, said annular closure comprising an elastic band attached to the front of said attachment end of said retainer.

5. The improved eyeglass retainer of claim 4, wherein said retaining enclosure further comprises a lip on the temple piece.

6. The improved eyeglass retainer of claim 5, wherein said lip is unitary to said temple piece.

7. The improved eyeglass retainer of claim 5, wherein said lip comprises a separate retainer enclosure affixed to said temple piece.

8. The improved eyeglass retainer of claim 4, wherein said retaining enclosure further comprises a groove within the temple piece.

9. The improved eyeglass retainer of claim 4, wherein said retainer includes at least one elastic sleeve located forward of the annular closure.

* * * * *